United States Patent [19]

Kramer

[11] Patent Number: 5,930,741
[45] Date of Patent: *Jul. 27, 1999

[54] ACCURATE, RAPID, RELIABLE POSITION SENSING USING MULTIPLE SENSING TECHNOLOGIES

[75] Inventor: James F. Kramer, Menlo Park, Calif.

[73] Assignee: Virtual Technologies, Inc., Palo Alto, Calif.

[*] Notice: This patent is subject to a terminal disclaimer.

[21] Appl. No.: 08/780,523

[22] Filed: Jan. 7, 1997

Related U.S. Application Data

[63] Continuation-in-part of application No. 08/395,430, Feb. 28, 1995, Pat. No. 5,592,401.

[51] Int. Cl.$^6$ .................................................... G01B 21/00
[52] U.S. Cl. .................. 702/153; 340/524; 340/573.7; 340/619; 340/686.1; 463/49; 473/128; 701/207
[58] Field of Search .................................... 364/550, 559; 702/153; 340/524, 573.4, 619, 686.1; 463/49; 473/128; 701/207

[56] References Cited

U.S. PATENT DOCUMENTS

| | | | |
|---|---|---|---|
| 3,868,565 | 2/1975 | Kuipers . | |
| 4,396,885 | 8/1983 | Constant | 324/208 |
| 4,542,291 | 9/1985 | Zimmerman | 250/231 R |
| 5,047,952 | 9/1991 | Kramer et al. | 364/513.5 |
| 5,280,265 | 1/1994 | Kramer et al. | 338/210 |

FOREIGN PATENT DOCUMENTS

| | | | |
|---|---|---|---|
| 06408 | 7/1993 | WIPO | A61B 5/103 |

OTHER PUBLICATIONS

Raab et al, "Magnetic position and orientation tracking system," IEEE Trans. on Aero. and Elect. Systems, vol. AES–15, No. 5, pp. 709–718, Sep., 1979.

Polhemus tech. note, "Latency–3SPACE® Magnetrak®, Tracker, Digitizer, and Isotrak®," P.O. Box 560, colchester, VT, 05446, Mar. 9, 1992.

Polhemus 3SPACE200® Fastrak® and Isotrak® II product data sheets, Oct. 1994 and Aug. 1993 respectively, P.O. Box 560, colchester, VT, 05446.

Ascension Technology Corp. data sheet #ATC 3–92, P.O. Box 527, Burlington, VT, 05402, Mar. 1992.

Ascension Technology Corp. tech. note,"Comparison of specifications: Ascension Bird vs. Polhemus Isotrak," P.O. Box 527, Burllington, VT, 05402, 1992.

(List continued on next page.)

*Primary Examiner*—John Barlow
*Assistant Examiner*—Hien Vo
*Attorney, Agent, or Firm*—Flehr Hohbach Test Albritton & Herbert LLP

[57] ABSTRACT

In accordance with the subject invention, devices and methods are provided for the accurate reporting of movement of an entity. Sensors which are accurate, but provide a delayed signal ("delayed signal sensors"), which delay is unacceptable for many applications, may be used in conjunction with fast sensors ("fast signal sensors"), which are usually subject to drift and other inaccuracies in providing information about a position. Additional sensors which may provide even more accurate and/or less signal sensor delay for a period of time, but which sensor signal is subject to periods of interrupted or undesirable output thereby making it unreliable ("unreliable signal sensors") may also be used in combination with one or more of the delayed signal sensors and fast signal sensors. By using a combination of such sensors, accurate, reliable position information is rapidly obtained to allow high-resolution and/or real-time analysis and depictions of movement. Complex rapid movements associated with athletics, music, and other rapid activities can be monitored in real-time to provide accurate information during the movement. Such information may then be used to analyze the movement, for instruction for improvement, for repeating the activity in a virtual setting and the like.

33 Claims, 5 Drawing Sheets

OTHER PUBLICATIONS

Ascension Technology Corp. advertisement, "From head to toe, we cover all the motions," CyberEdge Journal, p. 9, Nov./Dec. 1994.

Kistler Instrument Corp., "Advanced instrumentation for a world of applications," 75 John Glenn Dr., Amherst, NY, 14228–2171, Gen. Catalog K2.006, 3rd Ed, Jul. 1993.

Analog Devices, "Accelerometer data sheets and application notes," P.O. Box 9106, Norwood, MA 02062–9106, Apr. 1994.

Gyration, Inc., "Gyration open loop directional gyroengine, model GE9300C," 12930 Saratoga Ave., Bldg. C, Saratoga, CA 94070, data sheet C–1003, Sep. 1994.

BioVision, "State of the art motion capture," 2882 Sand HIll Road, Suite 116, Menlo Park, CA 94025, Porduct brochure, Aug. 1994.

Adaptive Optics Assoc., Inc., "Capture motion, release creativity," 54 Cambridge Park Dr., Cambridge, MA 02140–2308, Product brochure MT202–CM, Aug. 1994.

Tekscan, Inc., "Tekscan corporate capabilities," 451 D. Street, Boston, MA 02210, Jan. 26, 1991.

Interlink Electronics, "FSR™ integration guide and evaluation parts catalog," 546 Flynn Road, Camarillo, CA, 93012, 1993.

Wavefront Technologies,"Synthetic characters wish to exist," 530 E. Montecito Street, Santa Barbara, CA 93103, X–IST product announcement, Aug. 1994.

B.A. Marcus, W. Lucas, EXOS, Inc., P.J. Churchill, A.D. Little, Inc., "Human hand sensing for robotics and teleoperations," Sensors Magazine, Nov. 1989.

J.A. Hall, "The human interface in three dimensional computer art space," Master's Thesis, Massachusetts Institute of Technology, Oct. 1985.

E. Foxlin, N. Durlach, "An inertial head–orientation tracker with automatic drift compensation for use with HMD's," Proc. VRST'94 Conf., Aug. 23–26 1994, Singapore.

ACCURATE, RAPID, RELIABLE POSITION SENSING USING MULTIPLE SENSING TECHNOLOGIES

INTRODUCTION

This is a Continuation-In-Part of application Ser. No. 08/395,430, filed Feb. 28, 1995 now U.S. Pat. No. 5,592,401.

TECHNICAL FIELD

The field of this invention is rapid, accurate determination of position of an entity.

BACKGROUND

Recently there has been interest in motion data capture for use in such fields as graphical animation for movie production and virtual reality. Such motion data is also of interest to sports trainers and athletes to analyze athletic performance. There is also interest by the medical community, for example, in gait analysis. There are two main technologies presently being used to capture the motion data: (1) optical tracking; and (2) electromagnetic tracking.

Optical tracking can provide a high sample rate which is required to capture rapid movement with high resolution. One disadvantage of optical tracking is the potential for obscuring the light sources to the degree that no position solution can be determined. Optical tracking is primarily accomplished using triangulation and multiple light sources, which often requires time-consuming calculations to resolve multiple or visually obscured light sources and detectors. Therefore, the raw motion data is often recorded real-time but analyzed and positions computed off-line at a later time.

Electromagnetic tracking technology does not suffer from the problem of obscured sensors in a metal-free environment. Determination of position and orientation from the electromagnetic sensors can typically be performed in near real-time, however, with just enough delay (typically 4–50 ms) to provide unacceptable disparity between the physical and measured motion. The delay is largely due to the physics of the technology which requires the electromagnetic signal be transmitted, received, filtered and analyzed. Current devices provide a maximum sample rate of only about 120 Hz, while a sampling rate of from about 200 to 300 Hz is required to have an acceptable data resolution for rapid movement. The delay has made the electromagnetic devices unacceptable in applications requiring the tracking of rapid movements in real-time, e.g., conversion of human motion to music, while the slow sampling rate means the electromagnetic devices provide data with unacceptable resolution for tracking rapid athletic motion, such as a golf, tennis or batting swing.

There is, therefore, a need for a system which does not suffer from the shortcomings of the present optical and electromagnetic tracking systems, while providing a high rate of orientation and position data in real-time.

RELEVANT LITERATURE

1. F. H. Raab, E. B. Blood, T. O. Steiner, H. R. Jones, "Magnetic Position and orientation tracking system," *IEEE Trans. on Aero. and Elect. Systems.*, vol. AES-15, No. 5, pp. 709–718, September 1979.

2. J. Kuipers, "Object tracking and orientation determination means, system, and process," U.S. Pat. No. 3,868,565, Feb. 25, 1975.

3. Polhemus Technical Note, "Latency - 3SPACE® Magnetrak®, Tracker, Digitizer, and Isotrak®," P.O. Box 560, Colchester, Vt., 05446, publication date unknown.

4. Polhemus 3SPACE® Fastrak® and Isotrak® II product data sheets, 10/94 and 8/93 respectively, P.O. Box 560, Colchester, Vt., 05446.

5. Ascension Technology Corporation data sheet #ATC 3-92, P.O. Box 527, Burlington, Vt., 05402.

6. Ascension Technology Corporation Technical note, "Comparison of specifications: Ascension Bird vs. Polhemus Isotrak," P.O. Box 527, Burlington, Vt., 05402, publication date unknown.

7. Ascension Technology Corporation advertisement, "From head to toe, we cover all the motions," CyberEdge Journal, p. 9, November/December 1994.

8. C. Constant, "Device applicable to direction finding for measuring the relative orientation of two bodies," U.S. Pat. No. 4,396,885, Aug. 2, 1983.

9. Kistler Instrument Corporation, "Advanced instrumentation for a world of applications," 75 John Glenn Drive, Amherst, N.Y., 14228-2171, General Catalog K2.006, 3rd Edition, July 1993.

10. Analog Devices, "Accelerometer data sheets and application notes," P.O. Box 9106, Norwood, Mass. 02062-9106, April 1994.

11. Gyration, Inc., "Gyration open loop directional gyroengine, model GE9300C," 12930 Saratoga Ave., Bldg. C, Saratoga, Calif. 94070, data sheet C-1003, September 1994.

12. BioVision, "State of the art motion capture," 2882 Sand Hill Road, Suite 116, Menlo Park, Calif. 94025, Product brochure, August 1994.

13. Adaptive Optics Associates, Inc., "Capture motion, release creativity," 54 Cambridge Park Drive, Cambridge, Mass. 02140-2308, Product brochure MT202-CM, August 1994.

14. Tekscan, Inc., "Tekscan corporate capabilities," 451 D. Street, Boston, Mass. 02210.

15. Interlink Electronics, "FSR™ integration guide & evaluation parts catalog," 546 Flynn Road, Camarillo, Calif., 93012.

16. Wavefront Technologies, "Synthetic characters wish to exist," 530 E. Montecito Street, Santa Barbara, Calif. 93103, X-IST product announcement, August 1994.

17. B. A. Marcus, W. Lucas, EXOS, Inc., P. J. Churchill, A. D. Little, Inc., "Human hand sensing for robotics and teleoperations," Sensors Magazine, November 1989.

18. J. F. Kramer, P. Lindener, W. R. George, "Communication system for deaf, deaf-blind, or non-vocal individuals using instrumented glove," U.S. Pat. No. 5,047,952, Sep. 10, 1991.

20. J. F. Kramer, P. Lindener, W. R. George, "Strain-sensing goniometers, systems and recognition algorithms," U.S. Pat. No. 5,280,265, Jan. 18, 1994.

20. J. F. Kramer, "Determination of kinematically constrained multi-articulated structures," International Application No. PCT/US93/06408, Jul. 6, 1993.

21. T. G. Zimmerman, "Optical flex sensor," U.S. Pat. No. 4,542,291, Sep. 17, 1985.

22. J. A. Hall, "The human interface in three dimensional computer art space," Master's Thesis, Massachusetts Institute of Technology, October 1985.

SUMMARY OF THE INVENTION

Apparatus and methods are provided for quickly, accurately and/or reliably determining position of an entity by employing a combination of individual devices where the combination provides a position measurement which is superior to any of the individual devices comprising the combination when taken separately. In one embodiment, a fast inaccurate position sensing device ("fast device" or "fast position sensor") and a more accurate position sensing device which includes measurement latency or some other signal delay ("slow device" or "delayed signal sensor") are employed in combination. The position sensing process continuously takes samples from both the slow and fast devices. The sample rate of the fast device may be higher than the slow device. The subject invention correlates the data from the two devices such that the speed advantage of the fast device is combined with the accuracy benefit of the slow device. Such benefits include real-time performance with reduced position sensor latency, and off-line performance with increased position sensor sample resolution. Another embodiment provides a combination of a very accurate but unreliable device which may be fast or slow ("unreliable device" or "unreliable position sensor") with a moderately accurate but slow device ("slow device") and a device ("fast device") which is even less accurate but faster than the slow device. The subject invention correlates the data from the devices comprising the combination and produces a superior position estimate such that combination device will produce a signal value, nominally (a) as reliable as the most reliable signal value of the fast device and slow device; (b) as accurate as the most accurate signal value of the unreliable device and slow device; and (c) with as little sensor signal delay as the shortest delay of the unreliable device and the fast device.

DESCRIPTION OF THE SPECIFIC EMBODIMENTS

In accordance with the subject invention, apparatus and method are provided for determining the "true position" of an entity, e.g., a body part. By employing a combination of position-sensing technologies, position information from the combination provides a more reliable, accurate, and/or less delayed measurement system than any of the devices comprising the combination when taken separately. By employing a pair of sensors, where each sensor has different deficiencies and/or proficiencies, the deficiency of a signal value from one sensor may be improved with the signal value of the other sensor. As a result of the combination of sensors, the signal value will be as accurate, as reliable and least delayed as the most proficient aspect of the two sensors.

In one embodiment, the apparatus comprises a combination of a "fast" device which provides for relatively fast, relatively less accurate or provides fewer degrees-of-freedom of information (i.e., less complete information) about the position of the entity as compared to a "slow" device, where the information about the position of an entity at a particular position in time is not available for use by the measurement system until at least one sampling instance after position information is available from a fast device, but where the slow device provides more accurate or more degrees-of-freedom of information (i.e., more complete information) about position than the fast device. For a fast device which provides inaccurate data, the inaccuracy is typically due to a sensor output which drifts slowly as compared to the sampling rate of the sensor, i.e., which does not change appreciably from sample to sample such that the output from the device remains relatively accurate over a few sampling instances. Often, sensor drift may be due to sensor noise, transverse sensitivity, temperature sensitivity and the like. Other fast devices might provide position data which is incomplete, meaning that one or more of the 6 degrees of freedom (DOF) of the sensor location are not measured.

In general, we want to determine the true position, P(t), of an entity, e.g., a body part, at an arbitrary time, t. We assume that the samples from the fast device are available immediately, i.e., without delay, but the position value produced is $P_F(t)=P(t)-E(t)$, where $P_F$ is the position value produced by the fast device, P is the true position desired and E is the error deviation from the true position, which error is primarily due to an accumulating error such as sensor drift. The position values from the slow device, on the other hand, are assumed to be precisely P without error, but dt seconds old, i.e., $P_S(t)=P(t-dt)$, where $P_S$ is the position value produced by the slow device. We then correct or re-zero our current fast measurement by subtracting out an error term.

Figure 1:
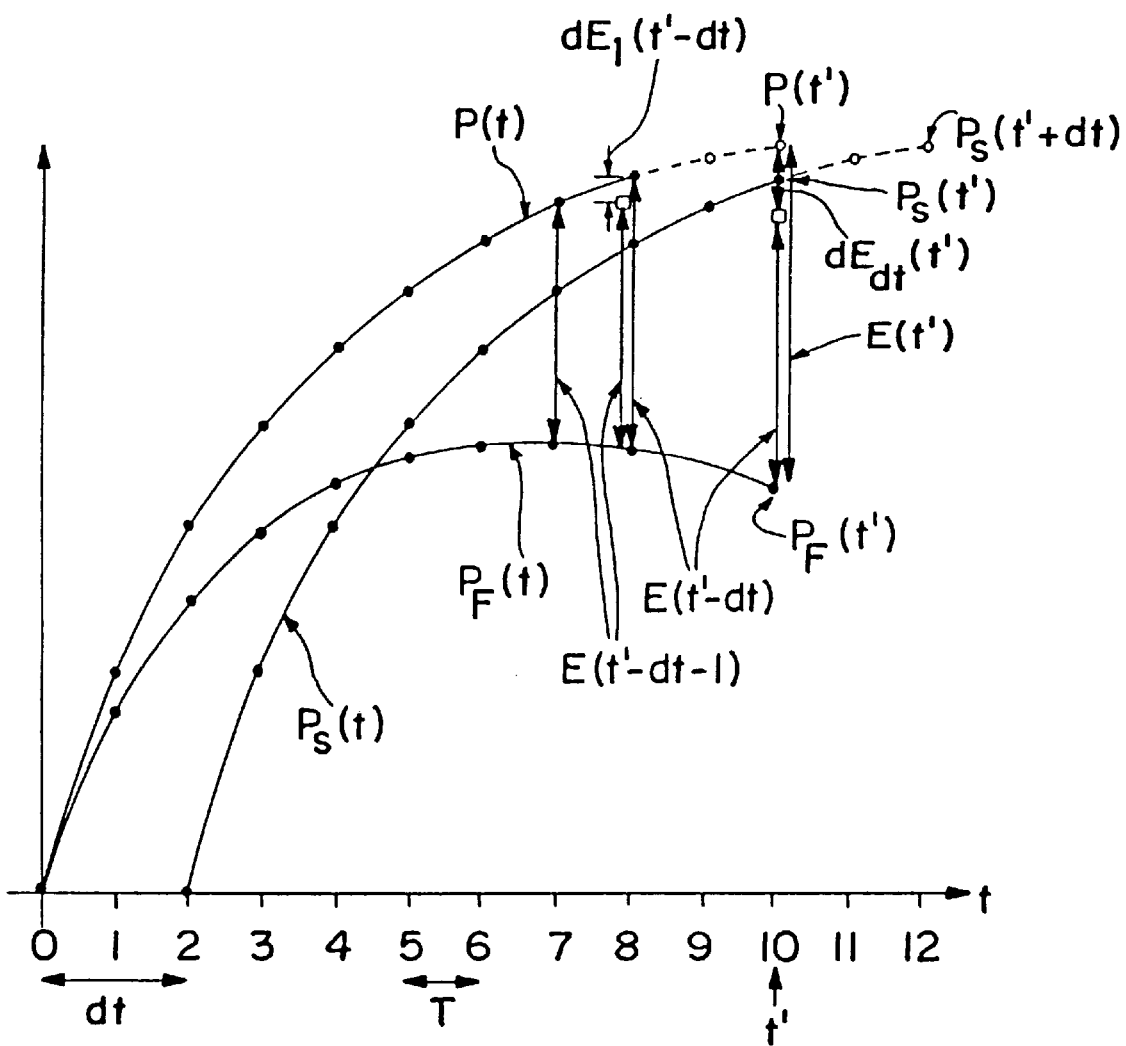
FIG. 1 is a curve illustrating the relationships between the position as determined by a fast device, a slow device, and the actual position of the entity.

FIG. 1 provides an example of the relationships between these parameters in the form of points and curves plotted versus time. As seen in the figure, the points corresponding to one DOF from the fast device, $P_F(t)$, are aligned in time with true position trajectory points P(t), but are offset in value by error E(t). The data points from the slow device, $P_S(t)$, are exactly equal to the true data points P(t), but are not available until dt seconds later. As illustrated in FIG. 1, is it assumed that the present sample time is t' and the sample period is T. (Note that the dashed portion of the curve and hollow sample points for $P_S(t)$ represents future values which have yet to occur, and the dashed portion with hollow circles of P(t) represents the corresponding portion which must be estimated.) Since dt is actually a continuous time value, e.g., seconds, we define an integer sample time index as n=t/T and so the difference in integer sample time indices is dn=dt/T. Note that n is only valid when dt corresponds to a sample time, and dn is only valid when dt is an integer multiple of the sample period, T. FIG. 1 shows the exemplary case where T=1 second, dt=2 seconds and thus dn=2. $dE_{dt}(t)$ is defined as the error accumulated only over the last dt seconds, assuming that $P_S(t)=P(t-dt)$, and $dE_1(t)=E(t)-E(t-1)$ is the error accumulated only since the previous sample. Note that $dE_1(t)$ is only determinable for t at least dt seconds ago.

The error term, E(t), which if we knew we could add to $P_F(t)$ to provide P(t), may be estimated in a variety of manners. From the estimate of E(t) and $P_F(t)$ we produce an estimate of P(t), denoted P^(t). In general, we let $$E(t)=E(t-dt)-dE_{dt}(t).$$

One simple estimate is to set the error term, E(t), of the present fast measurement equal to the difference between the present slow measurement (i.e., the present slow measurement which is determined to represent the placement of an entity dt seconds ago) and a prior fast measurement determined to correspond to that same sample instance dt seconds ago. In this estimate example, the slow measurement is effectively used as the accepted true value for dt seconds ago. The preceding estimate of E(t) is represented in equation form for time instance t' as $$E(t')=E(t'-dt).$$

Such a simple estimate, where $dE_{dt}(t')=0$, may be acceptable if we do not wish to attempt to estimate and remove any trends in the fast sensor signal drift.

A slightly more complex estimate of the error term, E(t'), of the fast measurement at time t', which incorporates a non-zero value for $dE_{dt}(t')$, is given as $$E(t')=E(t'-dt)+dn*[dE_1(t'-dt)]_{ave}$$

where the error over the most recent calculatable single sample period $$dE_1(t'-dt)=E(t'-dt)-E(t'-dt-1)$$

is averaged over a desired number m (where m>=1) of previous sample values of $dE_1(t'-dt)$ to yield $[dE_1(t'-dt)]_{ave}$. Here we assume that in addition to the error known to exist at the sample dt ago, E(t'-dt), the fast sensor has also drifted approximately the same amount during each sample period for the total (dt+m-1) time period, i.e., for a total of (dn+m-1) sample periods. The multiplication factor of dn is added since this average drift is assumed to occur over each of dn sample periods, from time (t'-dt) to the present time, t'.

A yet even more complex estimator may (instead of just averaging, i.e., zero order growth, or zero-slope first order growth) extract first, second or other order growth tendencies for $dE_{dt}(t')$, for example, by fitting a polynomial (e.g., a line or quadratic) through m (e.g., m=dn+1) previous values of $dE_{dt}(t')$ and then determining the value of the polynomial for $dE_{dt}(t')$ at time t', which when added to E(t'-dt) yields our estimate for E(t'). For instance, if we fit a straight line, e.g., using least squares techniques, through 3 previous samples of $dE_{dt}(t')$, where $dE_{dt}(t'-4)$ was 1, $dE_{dt}(t'-3)$ was 2 and $dE_{dt}(t'-2)$ was 3, we would estimate that $dE_{dt}(t')$ as 5. Thus, our estimate for E(t')=E(t'-dt)+5, and our estimate for P(t') is P^(t')=$P_F(t)$ +E(t'-dt)+5.

One may use other techniques for estimating the error terms or P(t) directly, by employing many of the accepted practices known in the fields of Estimation Theory and Kalman Filtering. Such techniques may incorporate knowledge of the dynamics and other physics of the sensing devices, along with a sequence of previous measurements, to produce a more elaborate error-correction algorithm. Estimation/prediction algorithms typically use one or more previously measured sensor values and errors (for example, deviations between prior slow and fast measurements) as inputs to an estimation filter which produces a prediction of the present sensor value or of the error at the present sample time. Such estimator algorithms may be implemented in software on a data processor. Using any of a variety present-value or error-term estimators/predictors, we may estimate the amount necessary to re-zero the fast device to reduce the expected error for the current fast sample. *Digital Control of Dynamic Systems*, by Franklin and Powell, *Adaptive Filtering Prediction and Control*, by Goodwin and Sin, *Random Signals: Detection, Estimation and Data Analysis*, by Shanmugan and Breipohl, *Linear Estimation* by Arthur Gelb and Discrete-Time Control Systems by Ogata provide good references for such estimation techniques.

The slow device may also be reporting data at a slower data rate than the fast device. In such a case, the slow device sampling time determines a type of "frame rate," i.e., the rate at which the more accurate data is being made available. In general, the slow data provided at each frame corresponds to a known previous inter-frame instance. Thus, when the fast sensor has a higher sampling rate, the fast sensor may also be used to fill in inter-frame position measurements where drift error in the fast sensor measurement has been accumulating only since the known previous inter-frame instance corresponding to the most recent slow measurement.

Various devices may be used as the fast and slow devices. In some instances a device will not have general applicability as to the positions and degrees of freedom which can be measured, but may be used in combination with other devices which have general applicability (but have one or more of their own shortcomings). For the fast devices, one will wish to measure translational and/or angular movement rapidly. Present day available devices include accelerometers, gyroscopes, and the like. Accelerometers are available from Kistler Instrument Corp., Amherst, N.Y. and Analog Devices, Norwood, Mass. Directional gyroscopes are available from Gyration Inc., San Jose, Calif., however, rate gyroscopes may also be employed. Other devices which find use include semiconductor-based orientation and translation-sensing devices. Accelerometers may be used for both translation and angular movement measurements. Gyroscopes measure the rotation of an entity, e.g., a body part about one or more axes. One may use one or a combination of accelerometers and gyroscopes, for example, for more complex joints (i.e., having a plurality of revolute intersecting joints, as exemplified by the shoulder and thumb trapeziometacarpal joint).

When accelerometers are employed, typical operation is as follows. At time zero, the accelerometer is at rest and its position known. From this point the accelerometer is allowed to move. By doubly integrating the signal from an accelerometer (where a single integration of the accelerometer signal yields the velocity), one can determine the position and/or orientation of the accelerometer sensor which may be affixed to a portion of the body. The double integration promotes the introduction of drift into the position signal calculation by continual accumulation of all minor acceleration errors, for example, errors introduced by sensor noise, transverse sensitivity, temperature sensitivity and the like. In some instances, sensor drift can be reduced, e.g., in the case of accelerometer temperature sensitivity, the accelerometer's temperature can be kept relatively constant using commercially available crystal ovens. Regardless of whether the sensor drift is reduced, over relatively short periods of time, the error accumulation might not reach a significant level. However, over longer periods of time, the error accumulation might become significant, in which case the determined position may need to be re-zeroed to eliminate this error. The re-zeroing may be accomplished by comparing the output which includes the error drift to a known or otherwise estimated reference value to determine the size of the error drift which may then be subtracted from the sensor output.

Other sensors which may find use in conjunction with the above combinations include bend sensors which measure the bend of a body part about a single axis (as exemplified by the elbow or knee). Bend sensors may be of many varieties, where typically bend sensors may be resistive bend sensors, fiber optic bend sensors, potentiometers and the like, as described in U.S. Pat. Nos. 5,047,952, 5,280,265, 4,542,291 and Marcus et al. Depending on the particular bend sensor and structure used, the bend sensor may not provide accurate information at a complex joint or about the absolute orientation of an elongated body part around its long axis. However, since bend sensors can provide fast, non-drifting angle measurements about a single axis, the fast angle information may be used in combination with slow sensors to produce faster measurements of certain selected important single-axis degrees of freedom. In such cases, the sensor values for the remaining orientation degrees of freedom, if measured only by the slow sensors, may lag. If it is undesirable to have some degrees of freedom with different latencies than others, a fast orientation-sensing device (e.g., an accelerometer or gyroscope) may be used (in addition to the bend sensor) solely to provide non-lagging orientation information which must then be re-zeroed as described above. Depending on its use, the fast sensor may vary in size. Particularly, for mounting on a human body, one would desirably have sensors which have their largest dimension less than about 4 cm, preferably less than about 2.5 cm. The sensor will usually be packaged in a form convenient for mounting on the body and with minimal interference with movement of the body part, and weight of only several ounces. The packaging may assume any convenient shape, particularly in association with a particular body part. The sensor may be mounted to various straps which may take the form of an elastic band or fixed to other wearable articles of clothing which retain their relationship with the point of interest.

For slow devices, one may use position sensors, such as electromagnetic sensors, as supplied by Polhemus, Inc., Colchester, Vt. and Ascension Technology Corp., Burlington, Vt. Other sensors which may find use, include optical tracking devices (including such systems as used by BioVision, Menlo Park, Calif. and Adaptive Optics Associates, Cambridge, Mass.), acoustic sensors (including such ultrasonic sensors as provided by Logitech, Freemont, Calif.), Global Positioning System sensors (GPS) or Differential GPS (DGPS) (including such sensors as provided by Trimble Navigation, Sunnyvale, Calif.), and the like.

Usually the optical tracker system will comprise one or more light sources and one or more light receivers, where the light sources will usually be mounted on the entity, and the light receivers mounted at fixed positions. The light sources and receivers may also be mounted at fixed positions and reflectors mounted on the entity, or sources and receivers mounted on the entity and reflectors mounted at fixed positions. In the following discussion of optical trackers, the case where the light sources are mounted on the entity and receivers mounted at fixed positions will be used to illustrate many of the considerations, however, the ideas provided are not to be limited to such case and may also pertain to a case which uses reflectors.

Optical trackers may be considered delayed signal sensors for a number of reasons. There will usually be at least two light sources and two light receivers for following the movement of the entity in 3 dimensions and determining its 6 degrees-of-freedom in space relative to a fixed reference coordinate system. In most instances there will be a plurality of light sources and a plurality of light receivers. Therefore, there will be multiple measurements which have to be sorted and analyzed to determine which light source is being received and the site of the light source, which may require triangulation. The art of triangulation procedures for determining the location of a point based on multiple measurements of the point relative to fixed known locations are well documented in the literature and will not be discussed in detail here.) While the signal is transmitted very rapidly from the light sources on the moving entity, the complexity and ambiguity of the signal will usually lead to slow processing. Ambiguity occurs when the light receiver or tracker is subject to being blinded during motion, so that there are periods of reduced intensity or erratic signal. Depending upon the motion path of the entity and barriers in the path, as well as whether the movement through the blind area is slow or fast, the data processor may be unable to determine the position of the entity for an extended period of time and may be uncertain as to the position of the entity when it exits the blind area. The uncertainty will include being unable to determine which sensors are in which positions in relation to their prior positions, before the light transmission became obscured. Therefore, with optical trackers, one is not only interested in using a second sensor to provide a rapid signal rapidly processed, but one is also interested in being able continuously to determine the position of the entity, without periods of unreliability and uncertainty. The second position sensor would still be desirable, even if the optical tracking information could be processed rapidly to provide the position information during the periods of signal interruption.

If rapid processing of optical tracking information could be achieved, there would still be a need for a second position sensor so that there would be an accurate position at the time that the optical tracker became unreliable. If the second position sensor were a fast sensor whose position value is subject to slow drift, the fast sensor signal may need to be re-zeroed at each sample period using the optical tracker position information so that in the event of unreliability of the optical tracker, the fast sensor output would be used and the error that would be introduced in the position of the entity would be occurring only from the time that the period of unreliability began. This approach is useful in any situation where one has a position sensor which may enter periods of unreliability of limited duration and then returning to a period of reliability and the companion position sensor is subject to drift or other accumulated error which is accumulated slowly as compared to the sampling period. The combination then allows for rapid response to position changes without interruption and minimizes the error during the monitoring time, even though one of the sensors may have periods where it is unable to report or unreliably reporting the position of the entity.

Various techniques may be employed to determine the initiation and termination of the period of unreliability. In many situations it will be sufficient that the positions determined from the two sensors diverge beyond what would normally be expected in relation to the drift of second sensor. With optical trackers, it may be sufficient that the intensity of light received by the light receiver falls below a predetermined value. With other position sensors, other indicia of unreliability may be employed.

Various sensors may be used in conjunction with the optical tracker to correct the faults of the optical tracker. The accelerometer can provide a rapid signal which will not be subject to the blind spots of the optical tracker. The accelerometer might also be able to provide position measurements at a higher data rate than the optical tracker, thus providing inter-frame measurement updates. However, during periods of little or no motion, the accelerometer can be subject to substantial drift over time. Unless, the optical tracker, or some other absolute position sensor, is able to be used to correct the drift, there will be uncertainty whether the entity is moving or one is observing drift. For this purpose, one can use a combination of fast and delayed sensors as described previously (e.g., an accelerometer and an electromagnetic sensor as a backup delayed sensor), in conjunction with the optical tracker, so that the advantages of the optical tracker may be enjoyed, but in the event of unreliability, such as resulting from a blind spot, one can still have a reliable rapid determination of the position and movement of the entity. By avoiding having to analyze whether the entity is in a blind spot and which of the optical devices on the entity are being observed from which sites when the entity emerges from the blind spot, the data processing can be greatly simplified, to provide for a more rapid optical tracker signal. In this way one can have a continuous rapid signal, using the optical tracker in conjunction with the fast sensor, while there is no unreliability, and switching to the fast and delayed sensors, e.g. accelerometer and electromagnetic sensor, when the optical tracker is in a period of extended unreliability.

GPS sensors presently have similarities to many optical tracking systems. One primary similarity is that the electromagnetic signal transmitted by a GPS source may be occluded by an object. Metallic objects may completely obstruct the GPS source signal, whereas other materials may slow passage of the signal thereby changing its apparent wavelength and phase relative to an unobstructed source signal. For DGPS, it is the phase information associated with the waveform that contains the distance information from which position information is obtained, therefore, any change in transmission properties due to objects in the signal path can have adverse effects on the position calculation. Some present GPS technologies also suffer from slow sample rates, hence much of the discussion above pertaining to optical tracking systems which may be slow or have portions of time where the signal becomes unreliable also applies to GPS technology and any other technology possessing similar properties.

The body may be considered a multiarticulated structure, i.e., comprised of articulated joints joined by links, where a joint represents the axis common to two links, about which one link rotates in relation to the other. For instance, two links may be the biceps and forearm, where the joint is the elbow. One may use the subject devices on a portion of the body or the whole body. In describing the various positions at which the devices may be placed, there may be various combinations depending on which body part positions are of interest. Also, by considering the kinematic constraints of the multiarticulated structure, one may limit the number and position of the sensors such that the endpoints of a class of kinematic chains may be the only positions actually measured, whereas one or more intermediate positions may still be inferred. Therefore, different organizations may be used and some will be described below, where the particular choice may depend on the intended use of the devices, economics, the information processing available, interference with body movement, the accuracy and rate at which information is desired, and other practical considerations. For a discussion of the body represented as a multiarticulated structure, see PCT/US93/06408, which disclosure is incorporated herein by reference.

In conjunction with the determination of the movement of a body part, ancillary sensors may be used to determine other information of interest, so as provide a data collection system. Pressure sensors may find use to determine the pressure of a body part, e.g., a finger or foot, against an object such as a club or bat, or against the ground. Such pressure sensors may come in the form of a force sensitive resistor, for example, sensors based on either change in resistance or change in capacitance. Interlink Electronics, Camarillo, Calif., and Tekscan, Inc., Boston, Mass., each produce a commercially available force/pressure sensing resistor. Infrared sensors or other gaze sensors may find application in following the movement of the eyes. Facial expression trackers (such as the X-IST, available from Wavefront Technologies, Santa Barbara, Calif.) may also find application. Respiration, perspiration, pulse, blood pressure, alpha and theta waves, muscle response, or the like may be measured to provide for a complete profile of an individuals response to a particular activity. Biocontrol Systems, Palo Alto, Calif., provide sensors for measuring eye gaze, i.e., electrooptigram (EOG), brain wave electrical signals (EEG) and muscle electrical command signals (EMG). A variety of devices are available for use with the subject invention to provide complete information about the movement of an athlete, worker, patient in rehabilitation, performer, virtual reality participant, movie animator, etc. Devices, such as electrodes, pressure sensors, chemical analyzers, and the like, find use. Electrodes may be placed at a variety of locations throughout the body, such as the biceps, thigh, stomach, gluteus maximus, neck, jaw, forearm, calf, head, temple, forehead, or other site of interest.

The data collection system may be used in a variety of ways. By analyzing the movement of a person, his physiology and other events, one can compare the data obtained to an idealized movement or predetermined data set, the psychological status of the person, and the effect of changes, suggestions, or the like and measure the response. A program can be developed where a data processor may compare the data received from the person and data obtained with others, for example professional athletes, where an athletic event is involved. In addition, the program could make suggestions as to changes and then monitor the effect of the suggestions as the person attempts to implement the changes. In this way, one can provide immediate feedback and reinforce proper response, while discouraging faulty responses. The data collection system may also be used to acquire the specific information necessary to produce the desired motions and expressions in animations controlled by such system.

The subject devices and data collection system may also be used in the playing of musical instruments. In the same manner as following athletic movements, one can monitor the movements associated with playing an instrument. In addition, one can monitor the sounds produced and relate movements of the hands and feet to changes in the sound. In this way, one can identify positions of hands, fingers or other limbs associated with specific sounds and provide suggestions as to how the fingers and hands should be positioned to obtain a desired sound. The subject devices, by providing real time responses to movement, can be applied to a host of different situations involving movement associated with a particular activity, where the activity is directed to a goal. In addition, the subject devices can store information relevant to the movements and goals, to provide comparisons, suggestions and paradigms, and monitor the effect of the information has on the activity of the individual. Data banks can be developed which can be related to particular positions and movements and the resulting performance.

The fast and slow position sensing devices may be distributed about the body in accordance with the nature and quality of the information to be obtained. Various combinations of devices and their positioning may find use. Many applications require rapid coordinate determination of only portions of the body, while measurements containing latency are adequate for the remaining portions. As an illustration, in sports requiring fast swings, such as golf, baseball and tennis, the arms move rapidly while the torso moves substantially more slowly and not as far. While it still might be desirable to use fast sensors to avoid the latency involved in measuring the torso movement, for many purposes the signals from the slower sensors may be acceptable due to the slower body motion.

A computer may be used to collect, store, analyze and otherwise process data from the motion and ancillary sensing devices. It is possible for the computer to compare data from a test subject with "ideal" data based on data from an expert or collected and analyzed from a plurality of subjects. The computer may then recommend modifications which would help the performance of the test subject more closely match the ideal performance. When a reduced number of sensors are used, as described in PCT/US93/06408, to measure position of various body parts, the computer may also be used to determine the placement of unmeasured links.

A sample combination and distribution of sensors might be the following. By employing three translational accelerometers and three angular accelerometers (or three pairs of accelerometers, where each accelerometer of a pair is offset from the other, and where the axis joining each pair of accelerometers is perpendicular to the axis joining each of the other pairs), we produce a six degree of freedom accelerometer, i.e. 6-DOF-A. When referring to accelerometers, it should be understood that one skilled in the art may replace the use of accelerometers with some other appropriate fast translation and/or angular sensors. The 6-DOF-A fast sensor may be affixed to each forearm, in addition to a 6-DOF electromagnetic slow sensor, i.e., 6-DOF-E. Continuing with this example, additional 6-DOF-E's may be located on the back between the shoulder blades, on the head, on the pelvis at the base of the spine and on the top of each foot. With these position sensor locations on the various links of the body producing "measured links," and using the kinematic constraints of the links of the body, the positions of the remaining "unmeasured links" may be determined (see PCT/US93/06408). In this manner the positions during movement of the arms, head, the upper torso, legs and feet may be determined. In addition, a CyberGlove™ (available from Virtual Technologies, Palo Alto, Calif.; U.S. Pat. Nos. 5,047,952 and 5,280,265) can be used to measure the position of the wrist, hand and fingers of each of the hands.

Depending on the economics, there need not be a one-to-one correspondence in the placement of the 6-DOF-A's (or individual accelerometers or other fast sensors) and 6-DOFE's (or other slow sensors). In the above example, it was assumed that the 6-DOF-A's were expensive and so they were employed only to provide fast information for the forearms, which would be necessary to provide fast measurement of an athletic swing. In the case where 6-DOF-A's were inexpensive, it might be useful to have one on each link, where the more expensive 6-DOF-E's were placed in a "minimal" configuration (as specified by PCT/US93/06408) and were used to re-zero each of the 6-DOF-A's. Of course, depending upon economics, as well as other considerations, more 6-DOF-E's may be used, i.e., in other than the minimal configuration. In the case where the 6-DOF-A's and 6-DOF-E's were not placed in one-to-one correspondence, the 6-DOF-E's may be used to calculate the accepted positions of the 6-DOF-A's, where such calculated positions are used to re-zero the 6-DOFA's. The calculation of the accepted positions may include knowledge of the kinematic constraints of the entity and associated kinematic structure, where such calculations follow in a manner suggested by PCT/US93/06408.

In a different configuration, bend sensors may be employed to correct one or more accelerometers or other fast sensor, such as a gyroscope. For example, two links are connected by a single-axis joint, where the position of one of the links is known and the other is measured with one or more accelerometers. By using a bend sensor to measure the joint angle, we can determine the position of the accelerometers relative to the known link and thus can re-zero the position sensor values provided by the accelerometers.

DETAILED DESCRIPTION OF THE DRAWINGS

For further understanding of the invention, the figures will now be considered. FIG. 1 provides a curve illustrating the relationships between one degree of freedom (DOF) of the position as determined by the fast device, the slow device, and the actual position of the entity. As mentioned above, the general problem is to determine the true position, P(t), of an entity, e.g., a body part, at an arbitrary time, t. We assume that the samples from the fast device are available immediately, i.e., without delay, but the position value produced is $P_F(t)=P(t)-E(t)$, where $P_F$ is the position value produced by the fast device, P is the true position desired and E is the error deviation from the true position, which error is primarily due to an accumulating error such as sensor drift. The position values from the slow device, on the other hand, are assumed to be precisely P without error, but dt seconds old, i.e., $P_s(t)=P(td-t)$, where $P_S$ is the position value produced by the slow device. We then correct, i.e., re-zero our current fast measurement by subtracting out an error term. As is seen in the FIG. 1, the points corresponding to one DOF from the fast device, $P_F(t)$, are aligned in time with true position trajectory points P(t), but are offset in value by error E(t). The data points from the slow device, $P_S(t)$, are exactly equal to the true data points P(t), but are not available until dt seconds later.

The error term may be estimated in a variety of manners, some of which have been mentioned previously. We now change to a more standard estimation/filter notation and provide a general framework which illustrates a class of more elaborate error estimation techniques used in formal estimation theory. In general, let the estimation of the position x of a point in space be a function of present and previous slow and fast measurements of position, i.e., $$x\hat{}(n)=f((y(n), \ldots, y(n-N)), (z(n), \ldots, z(n-p), \ldots, z(n-M)), \quad (1)$$

where

| | |
|---|---|
| x^(n) | = the "corrected" estimate of the position x of the entity calculated at present time sample n which estimate corresponds to the position at time n, x(n), |
| | = x__hat(n) (i.e., the 0 is more commonly shown directly above the letter, x), |
| | = P^(t/T), |
| y(n) | = a slower, more accurate measurement of position x received for processing at present time n but corresponding to the position p time samples earlier, x(n-p), |
| | = $P_s$(t/T), |
| y(n-N) | = a slower, more accurate measurement of position received N time samples ago but corresponding to the position N+p time samples ago, x(n-N-p), |
| z(n) | = a faster, less accurate measurement of position received at present time n and corresponding to the position at time n, x(n), |
| | = $P_F$(t/T), |
| z(n-p) | = a faster, less accurate measurement of position received p time samples ago and corresponding to the position p time samples ago, i.e., although received for processing at different times, z(n-p) and y(n) each correspond to the true position of the entity as it was p time samples ago, x(n-p), |
| z(n-M) | = a faster, less accurate measurement of position received M time samples ago and corresponding to the position n-M time samples ago, x(n-M), | and where x^(), y() and z() may each be vectors, usually, 6-DOF vectors where each component of the vector is one of the possible 6 spatial degrees of freedom of the entity.

The error, e(n), between the true position and our estimate is defined as $$e(n)=x(n)-x^{\wedge}(n). \tag{2}$$

A less-general version of equation (1) (motivation for which will be provided shortly below) which finds use is $$x^{\wedge}(n)=y(n)+A[z(n)-z(n-p)] \tag{3}$$

where matrix A tells us how to weight the difference between previous fast measurements, and in general, the functional dependence of A is as follows:

$$A=A(y(n-1), \ldots, y(n-N), z(n), \ldots z(n-M)).$$

A very simple case of (3) where A=I (or =1 if x and z are scalars) results in $$x^{\wedge}(n)=y(n)+[z(n)-z(n-p)]=[y(n)-z(n-p)]+z(n). \tag{4}$$

Figure 7:
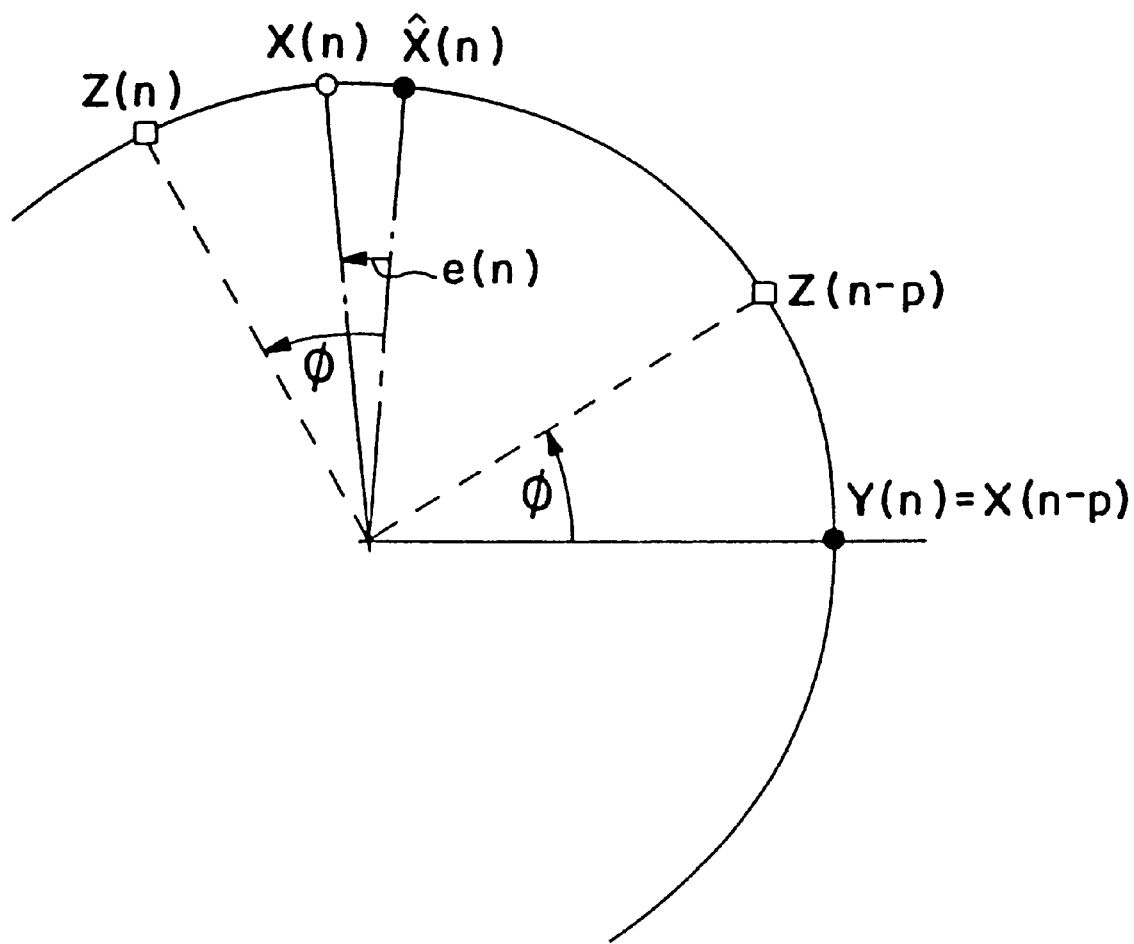
FIG. 7 shows the relationship of slow, fast and estimated sensor outputs for one type of estimator.

FIG. 7 illustrates Equation (4) where x is a single angular DOF and the fast sensor signal value, z, is drifting to produce an angle larger than the true angle, x. The estimation error, e, is defined by (2). This figure illustrates a simple estimator where the drift for the present position is estimated as the drift for a previous position, calculated as the difference between a delayed sensor signal value and the fast sensor signal value which corresponds to the same position in space as the delayed sensor signal value.

Rearranging (4) we get $$z(n)=x^{\wedge}(n)-[y(n)-z(n-p)]. \tag{5}$$

For comparison to our original notation above, we now convert this more standard estimation/filter notation back to our informal notation used previously which is in terms of time differences. As we shall see later below, when A=1 we get dz/dt=dx/dt. It follows that if the slopes in FIG. 1 remain the same, then E(t-dt)=E(t), i.e., the drift at any time sample is the same as the one following it. Thus, from (5), $$P_F(t)=P^{\wedge}(t)-E(t-dt),$$

and so $$P_F(t)=P^{\wedge}(t)-E(t), \tag{6}$$

which is the same as $P_F(t)=P(t)-E(t)$, which we provided originally, with the exception that we use $P^{\wedge}(t)$ in (6) to denote the fact that E(t) is estimated and not known a priori.

We now provide motivating derivation for the form of (3). Let $$z=h(x)+v \tag{7}$$

where z and x are defined above, v is measurement noise and where h() represents the (potentially non-linear) mapping which the fast sensor uses to generate its output value z when the know true position is x. If we differentiate z with respect to x we get $$dz/dx = dh(x)/dx \triangleq H(x). \tag{8}$$

Assuming $dz \approx z(n)-z(n-p)$ and $dx \approx x(n)-x(n-p)=x(n)-y(n)$, then $$z(n)-z(n-p)=H(y(n)) [x(n)-y(n)]. \tag{9}$$

Solving for x(n) we get $$x(n)=y(n)+H^{-1}(y(n)) [z(n)-z(n-p)]. \tag{10}$$

Using the formula for the pseudo-inverse of H(y(n)) and realizing that this yields an approximation for x(n) results in $$x^{\wedge}(n)=y(n)+\{H(y(n))^T H(y)(n))\}^{-1} H(y(n))^T [z(n)-z(n-p)], \tag{11}$$

which is exactly (3) if we let $A=\{H(y(n))^T H(y(n))\}^{-1} H(y(n))^T$. Note that in the case where a change in x produces a corresponding change in z we have that dz/dx=I=H(x) and so A=I, which leads to (4) and (5).

Where the dynamic model of the sensor is known, there are cases where measurement of a portion of the dynamic states can lead to acceptable estimation of unmeasured states, for instance, when the dynamic model is "observable." In such cases, it may be desirable to measure only a portion of the states with a fast sensor and a portion of the states with a delayed sensor, and use the dynamic model and known estimation techniques to estimate unmeasured states. In this example, states based on delayed sensor measurements, which may be either directly measured or estimated, may be used to re-zero states based on fast sensor measurements, which may be either directly measured or estimated. The process of using both measured states and states which are estimated using measured states may be readily extended to the case including unreliable sensors.

Figure 2:
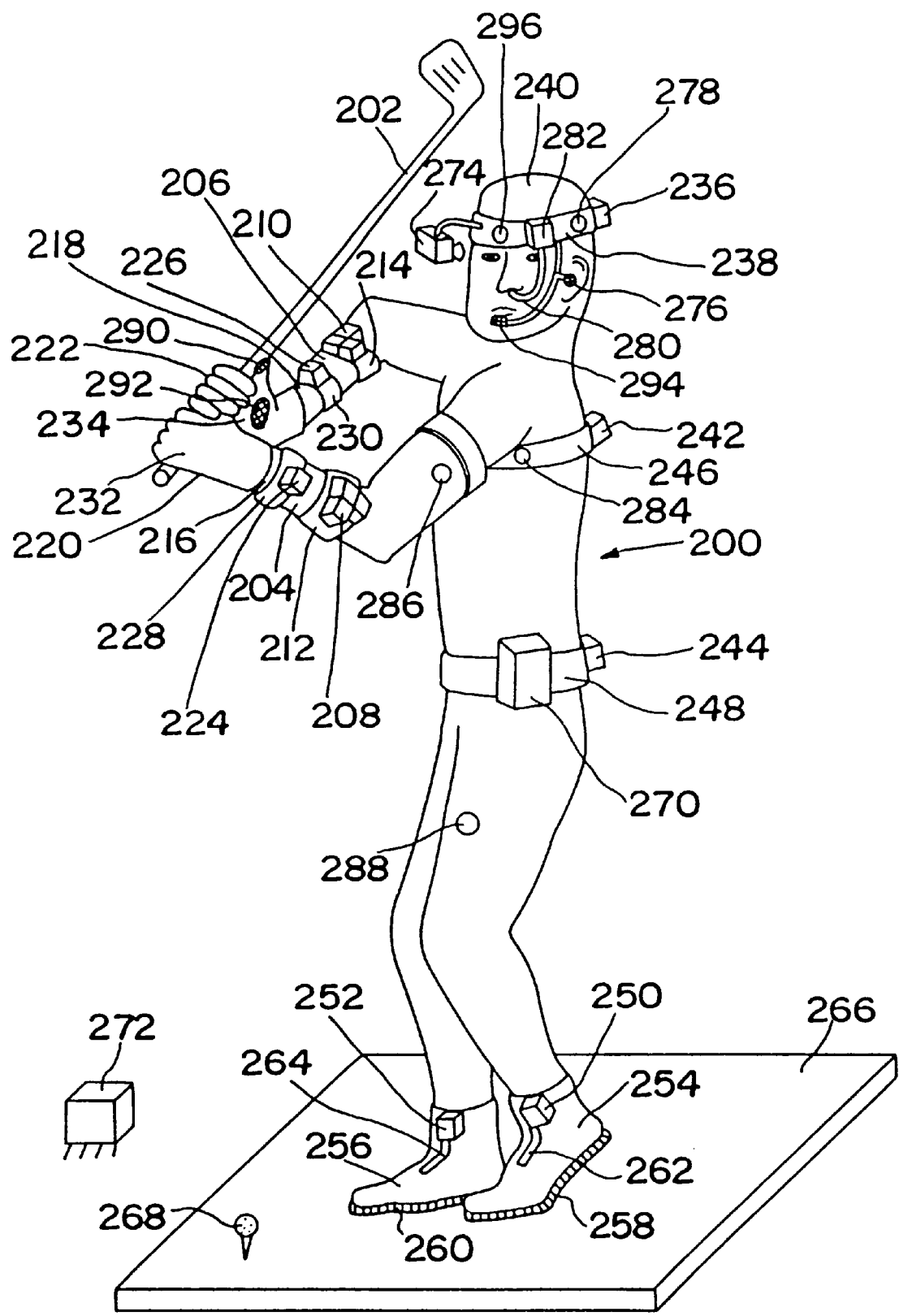
FIG. 2 is an elevated perspective view of a golf player wearing a device according to this invention.

FIG. 2 depicts a golf player wearing an apparatus according to this invention. A golfer was chosen to illustrate one of many applications and performance activities which may incorporate the various apparatus arrangements of this invention. The golf example is illustrative of the invention and is not to be construed as limiting the invention. The golfer 200 is depicted with golf club 202 in a raised position prior to swinging. The sensors are distributed about the body to determine the movement of the body parts during the swing. Securely mounted on the left and right forearms 204 and 206 are 6-DOF-A's 208 and 210, respectively, by means of wrist bands 212 and 214, respectively. The 6-DOF-A's are mounted on the forearm near the backside of wrists 216 and 218, respectively. By placement of the 6-DOF-A's on the backside of the wrists 216 and 218, acceptable movement resolution is achieved in the measurement by the 6-DOF-A's of the rotation of the hands 220 and 222 and wrists 216 and 218. On each of the forearms 204 and 206 are also securely mounted 6-DOFE's 224 and 226 by means of wrist bands 228 and 230, respectively. The 6-DOF-E's 224 and 226 are desirably located in proximity to the 6-DOF-A's 208 and 210, respectively, so that the sensors on each arm measure the same movement and so that the signals from the 6-DOF-E's may be used to accurately correct the signals from the related 6-DOF-A's.

In addition, instrumented gloves 232 and 234 employing strain gage joint angle bend sensors are worn to provide position information for the fingers and wrist joints of hands 220 and 222 during the golf club 202 swing.

A head 6-DOF-E sensor 236 is affixed to head band 238 mounted on the head 240. 6-DOF-E sensors 242 and 244 are positioned between the shoulder blades below the base of the neck and on the pelvis in the lumbar region by means of body straps 246 and 248, respectively. Additional 6-DOF-E sensors 250 and 252 are positioned near the ankle and affixed to socks 254 and 256, respectively.

A reference 6-DOF-E 272, which is usually an electromagnetic transmitter, but may in some situations be a receiver, is fixed in position away from the golfer.

In addition to the movement sensors, foot sole pressure and force sensors 258 and 260 positioned under the soles of the feet are provided to measure the pressure against the ground. Instead of the foot sole pressure sensors being worn on the feet, a pressure sensitive platform 266 on which the golfer stands, could be used instead or in conjunction. Also, bend sensors 262 and 264 are affixed at the ankle to measure the bend of the ankles. Pressure and force sensors may also be located at various other positions, such as on the finger and palmar regions of instrumented gloves 232 and 234. For example, force sensor 290 is located on the thumb of hand 222 and force sensor 292 is located on the palmar region. With such sensors, the grip force of the hand on the club, in addition to torsional and tangential forces exerted on the golfer's hand by the golf club, may be monitored during a swing.

Other ancillary sensors are also provided to determine additional information of interest. Eyegaze sensor 274 is shown mounted to headband 238 and provides the direction the eyes are looking, in addition to facial expression information. Such a sensor may be based on infrared technology, CCD camera technology or some other suitable technology. Detector 296 also provides information about the direction of eye gaze. Such a sensor may be an electrooptigraph (EOG) sensor, electrode or other appropriate sensor to detect eye gaze. Such eye gaze information may be used to associate the level of performance with patterns of eye gaze. For example, an improper contact of the golf club head with the golf ball may be determined to be due to not "keeping one's eye on the ball."

Respiration sensor 280 is used to monitor the volume of air inhaled and exhaled, the rates of respiration, the chemical composition of the inhaled and exhaled air, and the like. In the figure, one end of hollow tube 280 is placed in functional relation to the nose or mouth. The other end of tube 280 is attached to signal conditioning unit 282 which may be attached to headband 238 or some other convenient location. Signal conditioning unit 282 may provide some preprocessing of the respiration information before sending such information to data processor 270. Detector 278 is placed on headband 238 or at some other functionally appropriate location on the head and provides alpha and theta wave and other information about the state of operation of the participant's brain. Such a brain wave detector may be an electroencephalograph (EEG), an electrode or other appropriate sensor to detect the activity of the brain. Such information may be used to associate the level of performance with patterns of brain activity.

Earphone 276 and microphone 294 allow auditory feedback from, and input to, the data collection system. The electrical connections for such devices is not shown but may include a wire or be wireless. Such auditory feedback information provided by earphone 276 may include real-time or pre-recorded human or synthesized voice messages of support, critique or suggested technique modifications. Such auditory information may also include musical or other tones which may effect performance or provide entertainment. Microphone 294 may be used to record sounds generated by the golfing participant. Such sounds may be involuntary or intentional and may provide auditory communication with a performance expert, where the expert may be a live person presently or previously monitoring the performance or may also be a program running on the data processor 270, such as an Artificial Intelligence (AI) performance Expert System. Earphone 276 and microphone 294 may be mounted to headband 238 or supported in some other convenient manner, such as clipped to the earlobe.

Sensor 284 is a perspiration sensor mounted such that it can detect the presence of and change in perspiration. An example location is near the armpit, and may be mounted to band 246 or to some other convenient support. Such perspiration information may be used to associate level of performance with perspiration response. Muscle activity sensors 286 and 288 are located in functional relationship to various muscles of interest. Such muscle activity sensors may be electromyograph (EMG) sensor, an electrode or other appropriate sensor to detect the activity of the neighboring muscle. Such muscle activity may be correlated with a desired level of muscle activity and desired order in which muscles should be activated to yield a preferred performance response.

To preserve clarity in the figure, optical tracking technology has not been shown but may also be included in the data collection system and work in cooperation with one or more of fast and delayed sensor technologies.

Having identified the individual sensors and their positions, the manner in which the movement of the golfer is followed from a position in mid-swing will now be considered. The golfer is shown positioned with his head looking downwardly at the golf ball 268, the golf club raised in preparation for the forward swing, the wrists cocked back, the right foot placed flat on the ground and the left foot with the heel raised. As the golfer begins the swing, the club head comes around, the arms begin the downward pendular swing. The trajectory of the forearms, including position and orientation, is tracked by the 6-DOF-A's 208 and 210 and the 6-DOF-E's 224 and 226. (Note, frequently in our description, when we refer to position or spatial placement, we intend 6 DOF position, i.e., both 3 DOF position and 3 DOF orientation be included.)

The spatial placement information is transmitted to a data processor 270 by wires, not shown, and is mounted on strap 248. The data processor may also be placed off the golfer at a convenient site, using extended wire leads or, in either case, wireless communication. The data processor may perform any necessary signal conditioning of raw signals and calculating of actual numbers more clearly representing the 6 degrees of freedom of the entity to which the 6-DOF sensor is affixed. For a 6-DOF-A, the data processor integrates the conditioned raw signal and re-zeros it using the appropriate 6-DOF-E's. The data processor 270 may serve to simply log the conditioned or calculated data from the array of sensors mounted to measured body parts and/or it may calculate and/or log the spatial placement of one or more unmeasured body parts (links) or other desirable motion parameters. As described previously, in calculating the spatial placement, the delayed data from each of the 6-DOF-E's is used to correct for the drift in the faster data from its associated 6-DOF-A on the same forearm. The data processor receives the spatial placement information from each pair of 6-DOF-E and 6-DOF-A sensors, performs the necessary mathematical manipulations and calculations, and produces the corrected spatial placement information of the associated forearm. Using the spatial placement of the base of the neck 6-DOF-E sensor 242 relative to the calculated spatial placement of the forearm, one calculates the spatial placement of the intermediate body parts modeled as links using the kinematic constraints of the links (See PCT/US93/06048). Body parts of interest would include the biceps and the collar bones.

Information about the spatial placement of the wrist, hand, and fingers, and hence the club, is determined using the instrumented gloves 232 and 234 and the wrist angle as measured by the gloves 232 and 234 relative to the calculated spatial placement of the forearms 204 and 206, respectively. The spatial placement of the head 240 is determined by head mounted 6-DOF-E sensor 236. The spatial placement of any point along the neck is determined by the functional relationship between the head and the base of the neck, where the spatial placements are known. In torsion an intermediate point may simply be interpolated between the orientation of the head relative to the base of the neck. As the head tilts in any direction, the spatial placement of an intermediate point may be determined by a spline connecting the head to the base of the neck. Such a spline may possess a constant radius or may be parabolic, hyperbolic or some other suitable functional curve.

The spatial placement of a point on the spine is calculated similarly to a point on the neck. In the case of the spine, the two measured points are the base of the neck 6-DOF-E sensor 242 and the 6-DOF-E lumbar sensor 244. As with the neck, spatial placement of unknown points between these two measured points are interpolated based on a theoretical curve modeling the flexure and torsion of the spine based on the movement of one of the two measured points relative to the other measured point.

Figure 3:
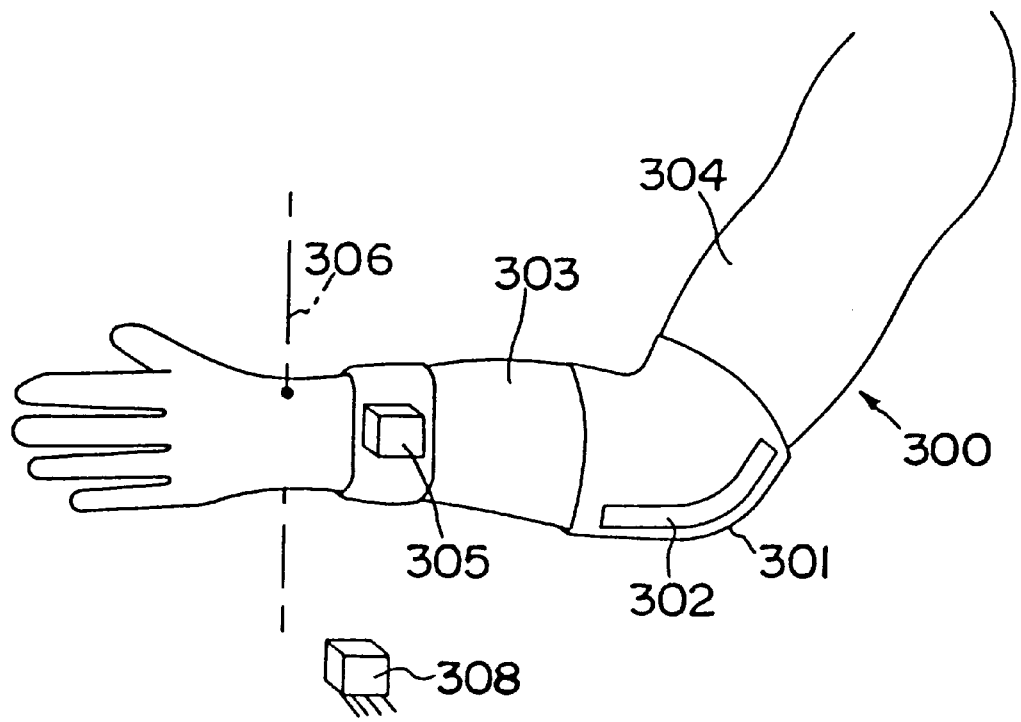
FIG. 3 is a diagrammatic view of a device on an arm comprising a fast bend sensor and a fast translational sensor.
Figure 4:
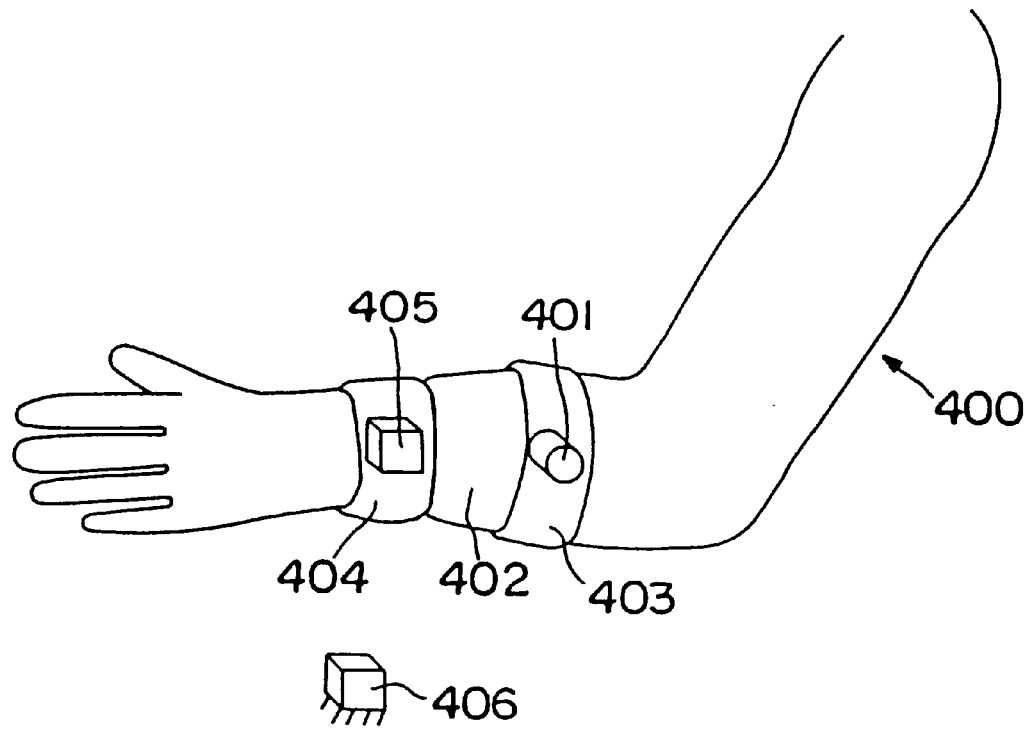
FIG. 4 is a diagrammatic view of a device on an arm comprising a slow electromagnetic sensor and a fast angular sensor.

In FIGS. 3 and 4 are alternative embodiments of the subject invention, using different combinations of fast and slow sensors. In FIG. 3, mounted on arm 300 at elbow 301 is bend sensor 302. The bend sensor 302 provides for rapid information as to the position of the forearm 303 in relation to the bicep portion 304 (i.e., the humerus bone). Mounted on forearm 303 is a 6-DOF-E 305 with reference sensor 308. The bend sensor 302 is functionally connected to a source of electricity, e.g., by a wire 307.

The bend sensor 302 can give information about the relative angular position of the bicep 304 and forearm 303, but might not provide information about how the forearm 303 may be twisting as measured by the change in angle of the wrist axis 306 about the long axis of the forearm. The 6-DOF-E 305, positioned in functional relationship to the arm by means of a mount, e.g., strap 308, can give information about the position of the forearm 303 in relation to the bicep and its twist, but the information is delayed as compared to the signal from the bend sensor 302. One can use the fast position information from the bend sensor 302 to indicate the position of the forearm relative to the bicep. Additionally, by making assumptions based on prior correlations between the bending of the elbow and twisting of the wrist, and the kinematic constraints of the arm, and using the information from the 6-DOF-E 305 to indicate the prior positions and twists of the forearm, one can use the present fast angular information from the bend sensor 302 to estimate the present twist of the forearm. A simple calculation uses the ratio of (forearm twist)/(elbow bend) calculated from the most recent 6-DOF-E 305 measurement, and multiplies it by the present elbow bend measurement from the fast bend sensor 302 to produce the present fast estimate of forearm twist.

In FIG. 4, the arm 400 has a gyroscope 401 mounted on the forearm 402 by means of strap 403. The gyroscope in this example provides 3 DOF of angular motion sensing: the rotation of the forearm about its longitudinal axis, the rotation of the forearm relative to the bicep due to bending of the elbow, and rotation of the forearm about the long axis of the humerus bone when the axis through the forearm and humerus are not colinear. In close proximity, attached to strap 404 mounted on forearm 402 is a 6-DOF-E 405 with reference sensor 406. The combination of the gyroscope 401 and the 6-DOF-E 405 operate substantially in the same manner as described for the 6-DOF-A 208 and 6-DOF-E 224 in FIG. 2. The gyroscope 401 is connected to a source of power, not shown. The rapid signal of a present position obtained from the gyroscope 401 can be corrected by using the information obtained from both the gyroscope 401 and the 6-DOF-E 405 for a prior position.

Figure 5:
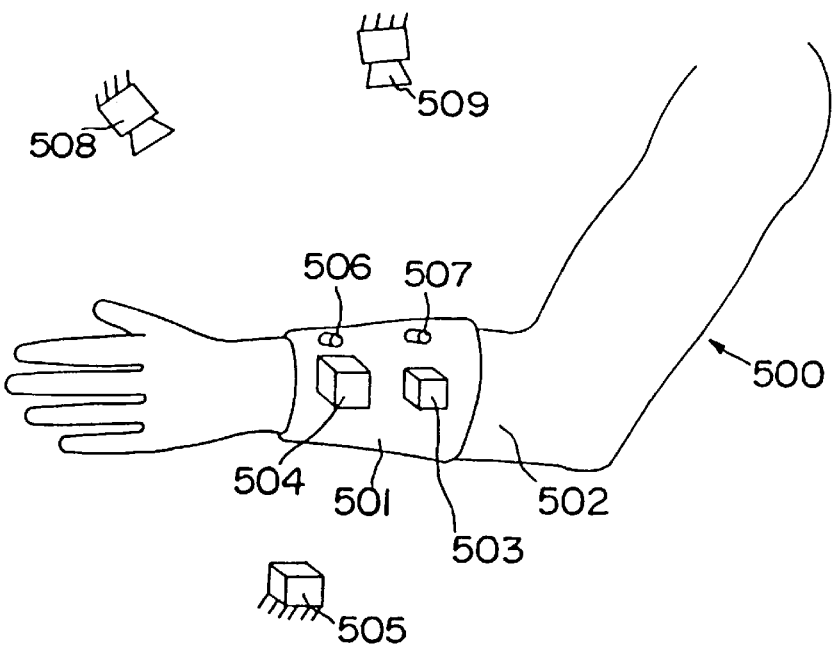
FIG. 5 is a diagrammatic view of a device on an arm comprising a slow electromagnetic sensor, a fast angular sensor and an unreliable optical tracking sensor.

In FIG. 5, the arm 500 has 6-DOF-A 503 mounted on the forearm 502 by means of strap 501. Also mounted to strap 501 is a 6-DOF-E 504, where electromagnetic reference sensor 505 is mounted to a location not attached to the arm 500. Optical tracking system light sources 506 and 507 are also mounted to strap 501 and are sensed by light sensors 508 and 509. The light sensors may be CCD cameras, lateral effect photodiodes or some other one or multi-dimensional photo detector. The light source is commonly a light-emitting diode (LED) but may be an incandescent or fluorescent light or some other photon emitting device.

In general, there may be one or more light sources and one or more light sensors, where the number of sources and sensors employed may depend on the number of degrees of freedom to be ascertained and the level of redundancy.

Typically, a minimum of two sources and two sensors are needed to determine 6 DOF's of an object in space, i.e., the 3 DOF of position and 3 DOF of orientation. In many cases it is desirable to use more than two sources or two sensors to provide redundancy in case a source/sensor pair is occluded by an object, or also to provide additional redundant equations to improve position calculation accuracy, for example to provide a least squares solution. The light sources 506 and 507 may be continually emitting light, or they may produce a very bright flash, each at a specified time normally synchronized to the light sensors 508 and 509, or they may also produce a light modulated by a frequency also normally available to the light sensors 508 and 509. When the light sources are continually emitting light, it might be more difficult to distinguish between the light sources, especially when more than one light source is occluded for a period of time. To help identify and re-sync the light sources, they may be pulsed one or more at a time so the pulsed light source will stand out and may be readily identified by the sensors. Alternately, the various light sources may each be modulated with its own frequency which can be demodulated by the various light sensors, e.g., using bandpass filters, to recover light source identity. Similarly, each light source might be a unique color of light where the light sensors are able to determine the color of light which they are detecting, e.g., using optical filters and the like.

As already explained in general, in FIG. 5 the position (including orientation) of the forearm may be determined using the light sources and sensor and one of a variety of triangulation algorithms known in the art. In the case where one or more light source/sensors pairs is occluded and the position cannot be uniquely determined, or in the case where the triangulation data calculation provides data which is delayed relative to the 6-DOF-A data, the 6-DOF-A 503 may be used to provide fast but slowly drifting data. During the times when the optical tracking system is able to produce a position calculation, that result is used to re-zero the 6-DOF-A integrated position value. In the case where the optical system has too many light source/sensor pairs occluded to produce a position measurement, the 6-DOF-E sensor 504 may be used to provide delayed non-drifting position measurements to re-zero the 6-DOF-A's until the optical system can again produce a valid position measurement.

FIG. 5 provides an example combination of a fast position sensor, a delayed position sensor and an unreliable position sensor working together to provide a quick, accurate and reliable position measurement of an entity, in this illustration the entity being a forearm. The technique illustrated here of combining two or more of the fast, delayed and unreliable position sensor technologies may be applied to other entities, including other parts of the body, especially portions of the hands and especially the thumb. In instances where the combination of position technologies is to determine the position of a finger, practical space considerations may make it desirable to put a single position sensing technology on a single phalanx of the same finger or metacarpus, where the relationship between the phalanges is determined by a bend sensor.

Figure 6:
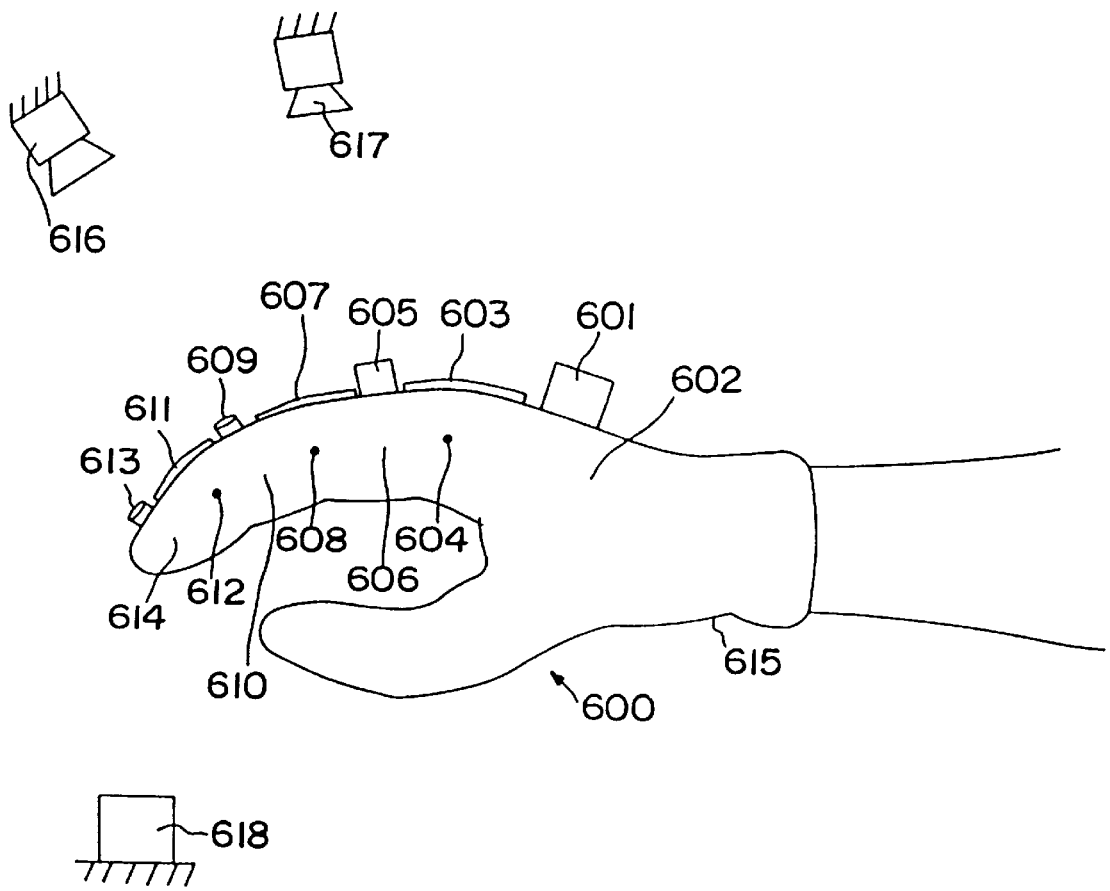
FIG. 6 is a diagrammatic view of a device on a hand comprising a slow electromagnetic sensor, a fast angular sensor, an unreliable optical tracking sensor and fast bend sensor.

Since any physical position sensor has a non-zero size and weight, it may be desirable to spread out their placement on an entity so the size and weight are not concentrated in a single location. In some instances, for example on the hand, there may not be sufficient space to place all desired position sensors on a single phalanx of a finger, or in another single location When the position sensors are not all located in the same place on an entity, their relative placements should be known or determined, e.g., by measuring, so the position sensor values may be transformed to a single location to be related so the deficiency of one position sensor value may reduced using the proficiency of another position sensor value. FIG. 6 provides apparatus and an exemplary disposition of various position sensors to measure the position of one or more portions of the hand 600. Various other combinations of position sensors and placements of the sensors may be used depending on the specification of a particular application. Various position sensors are held in functional relationship to the hand using straps, bands and the like, and in FIG. 6 using a glove 615. 6-DOF-E sensor 601 is affixed to glove 615 over the metacarpus 602 of the hand; electromagnetic reference sensor 618 is located at a reference location not a part of the hand; bend sensor 603 measures metacarpophalangeal joint 604; 6-DOF-A 605 is affixed to glove 615 over the proximal phalanx 606; bend sensor 607 measures the joint angle of the proximal interphalangeal joint 608; light source 609 is affixed to glove 615 over the middle phalanx 610; bend sensor 611 measures the distal interphalangeal joint angle 612; light source 613 is affixed to the glove 615 over distal phalanx 614; and light sensors 616 and 617 are affixed to a reference location not a part of hand 600. Using the bend sensors to relate the various phalanges, the position data from the position sensors located on the phalanges may be combined so as to produce a position measurement with the desired reliability, speed and accuracy.

As presented above, FIG. 7 illustrates Equation (4) where x is a single angular DOF and the fast sensor signal value, z, is drifting to produce an angle larger than the true angle, x. The estimation error, e, is defined by (2). This figure illustrates a simple estimator where the drift for the present position is estimated as the drift for a previous position, calculated as the difference between a delayed sensor signal value and the fast sensor signal value which corresponds to the same position in space as the delayed sensor signal value.

A useful embodiment estimates the velocity of an electromagnetic sensor (or other noisy sensor) using another sensor, such as a goniometer or accelerometer. As the estimated velocity increases, the filtering of the noisy sensor is decreased. For example if the goniometer sensors aren't moving, the amount of filtering can be increased very high. If the goniometer sensors are moving very quickly, the amount of filtering can be reduced.

In accordance with the subject invention, devices and methods are provided for the improved reporting of movement of an entity. By using combinations of sensors, where the deficiency of one may be compensated for by the proficiency of the other, improved results as to position and/or time of the entity is obtained. For example, sensors which are accurate, but provide a delayed signal, which delay is unacceptable for many applications, can be used in conjunction with fast sensors, which are usually subject to drift and other inaccuracies in providing information about a position. Additionally, primary sensors which operate unreliably may also be used in conjunction with other more reliable secondary sensors which provide position information during periods of unreliability of the primary sensors. By using a combination of sensors, accurate reliable information is rapidly obtained to allow real time analysis and depictions of movement. Complex rapid movements associated with athletics, music, and other rapid activities can be monitored in real time to provide accurate information during the movement. Such information may then be used to analyze the movement, for instruction for improvement, for repeating the activity in a virtual setting and the like.

While the invention has been described primarily with reference to embodiments specific to measuring the position of human body-parts, the description is illustrative of the invention and is not to be construed as limiting the invention. For example, among other things, sensor types, sensor configurations, sensor locations, support structures and mathematical solutions provided are intended to exemplify a class of problems which may be solved using the apparatus and methodology provided by the subject invention. The sensor types, sensor configurations, sensor locations, support structures and mathematical solutions may be modified to determine more desirable defining parameters and position estimates of an entity without deviating from the intended scope of the subject invention.

Any publication or patent described in the specification is hereby included by reference as if completely set forth in the specification.

Various modifications and amplifications may occur to those skilled in the art without departing form the true spirit and scope of the invention as defined by the appended claims.

What is claimed is:

1. A device for providing an improved signal value in relation to a change in position of a movable entity along a path, said device comprising at least two sensors, wherein each one of a pair of said sensors has a deficiency not shared by the other sensor and a proficiency not shared by the other sensor, said deficiencies and proficiencies relating to position and time, said device comprising:

first and second position sensors providing first and second signal values, respectively, for said position, where each of said first and second signal values have a proficient component and a deficient component of said signal values, wherein said signal values are different;

each one of said sensors mounted on sensor supports for positioning in functional relationship to said entity for measuring the movement of said entity; and a data processor for receiving said first and second signal values for said entity, selecting said second proficient component from said second signal value and improving said first signal value with said second proficient component, where the sampling instant for the second position sensor is selected independently of the rate of movement of said second position sensor.

2. A device for measuring change in position of a movable entity along a path comprising:

a delayed position sensor for providing a delayed signal value relating to a position of said entity along said path;

a fast position sensor for providing a fast signal value relating to an approximation of a position of said entity along said path, wherein said fast signal value incorporates less delay and is less accurate than said delayed signal value;

each one of said sensors mounted on sensor supports for positioning in functional relationship to said entity for measuring the movement of said entity;

a data processor for receiving said fast and delayed signal values for said entity, said signal values comprising (a) a present fast signal value and a prior fast signal value relating to approximations of a present and prior position, respectively, from said fast position sensor and (b) a delayed signal value for said prior position from said delayed position sensor, receiving said fast signal value for said present position and said delayed signal value for said prior position in the same sampling cycle, and using said delayed signal and said fast signal values for said prior position to improve said present fast signal value approximation for said present position, where the sampling instant for the delayed position sensor is selected independently of the rate of movement of said delayed position sensor.

3. A device according to claim 2, wherein said data processor further recording fast and delayed signal values for a plurality of sampling cycles and using said signal values to improve said present fast signal value approximation for said present position.

4. A device according to claim 2, wherein said data processor further using the difference between said delayed signal and said fast signal values for said prior position to improve said present fast signal value approximation for said present position.

5. A device according to claim 2, wherein said fast position sensor comprises at least one accelerometer.

6. A device according to claim 2, wherein said fast position sensor is a gyroscope.

7. A device according to claim 2, wherein said delayed position sensor is an electromagnetic position sensor.

8. A device according to claim 2, wherein said entity is a body part.

9. A device according to claim 8, wherein said body part comprises at least one of a complex joint or rotational joint.

10. A device for measuring changes in position of body parts along one or more paths comprising:

one or more multiple degree of freedom electromagnetic sensors for providing a delayed signal value relating to a position for each body part along said one or more paths;

one or more multiple degree of freedom accelerometers for providing a fast signal value relating to an approximation of a position for each body part along each of said paths, wherein said fast signal value incorporates less delay and is less accurate than said delayed signal value;

each one of said sensors mounted on body part fitting supports for positioning in functional relationship to each of said body parts for measuring the movement of each of said body parts;

a data processor for receiving, for each of said body parts, said fast and delayed signal values, said signal values comprising (a) a present fast signal value and a prior fast signal value for each said body part relating to approximations of a present and prior position, respectively, from said accelerometer and (b) a delayed signal value for said prior position from said electromagnetic sensor, receiving said fast signal value for said present position and said delayed signal value for said prior position in the same sampling cycle, and using said delayed signal and said fast signal values for said prior position to improve said present fast signal value approximation for said present position, where the sampling instant for each electromagnetic position sensor is selected independently of the rate of movement of said electromagnetic position sensor.

11. A device according to claim 10, wherein said device has at least two each of six degree of freedom accelerometers and electromagnetic sensors.

12. A device according to claim 10, wherein said body parts comprise at least one of a complex joint or rotational joint.

13. A device according to claim 10, wherein said body parts comprise an arm.

14. A device for measuring change in position along a path of a movable articulated entity comprising two links connected by a joint, said device comprising:
- a delayed position sensor for providing a delayed signal value relating to a position of said entity along said path;
- a fast position sensor for providing a fast signal value relating to an approximation of a position of said entity along said path, wherein said fast signal value incorporates less delay and is less accurate than said delayed signal value;
- a goniometer sensor mounted in functional relationship to the joint connecting said two links of said entity for providing a fast signal value relating to the bending of said joint;
- each one of said sensors mounted on sensor supports for positioning in functional relationship to said entity for measuring the movement of said entity;
- a data processor for receiving said fast and delayed signal values for said entity, said signal values comprising (a) a present fast signal value and a prior fast signal value relating to approximations of a present and prior position, respectively, from said fast position sensor, (b) a delayed signal value for said prior position from said delayed position sensor, and (c) a fast signal value from said goniometer sensor for providing the angle of bending of said joint, receiving said fast signal value for said present position and said delayed signal value for said prior position in the same sampling cycle, and using said delayed signal and said fast signal values for said prior position to improve said present fast signal value approximation for said present position, where the sampling instant for the delayed position sensor is selected independently of the rate of movement of said delayed position sensor.

15. A device according to claim 14, wherein said fast position sensor comprises at least one accelerometer, said delayed position sensor is an electromagnetic sensor and said goniometer is a strain gage bend sensor.

16. A device for measuring changes in position of body parts along one or more paths comprising:
- one or more multiple degree of optical tracking sensors for providing a delayed signal value relating to a position for each body part along said one or more paths, wherein said delayed signal value is subject to blind spots and delay in processing;
- one or more secondary sensors for providing a continuous signal value relating to a position for each body part along each of said paths, wherein said continuous signal value is free of blind spots to which said optical tracking sensor is subject and is less accurate than said delayed signal value;
- each one of said sensors mounted on body part fitting supports for positioning in functional relationship to each of said body parts for measuring the movement of each of said body parts;
- a data processor for receiving, for each of said body parts, said continuous and delayed signal values, said signal values comprising (a) a present continuous signal value and a prior continuous signal value for each said body part relating to a present and prior position, respectively, from said secondary sensor and (b) a delayed signal value for said prior position from said optical tracking sensor, receiving said continuous signal value for said present position and said delayed signal value for said prior position in the same sampling cycle, and using said delayed signal and said continuous signal values for said prior position, or a previous prior position when there is no delayed signal value for said prior position, to improve said present continuous signal value approximation for said present position, where the sampling instant for the optical position sensor is selected independently of the rate of movement of said optical position sensor.

17. A device according to claim 16, wherein said secondary sensor is a multiple degree of freedom accelerometer for providing a fast signal value relating to an approximation of a position for each body part along each of said paths.

18. A device according to claim 17, further comprising one or more multiple degree of freedom electromagnetic sensors to provide a second delayed signal value relating to a position for each body part along said one or more paths, wherein said second delayed signal value is subject to delay in processing; and wherein
- said data processor receives for each of said body parts said second delayed signal value for said prior position, receiving said continuous signal value for said present position and said delayed signal value for said prior position in the same sampling cycle, and using said second delayed signal for said prior position and said continuous signal values for said prior position and present position, when there is no delayed signal value for said prior position, to improve said present continuous signal value approximation for said present position.

19. A device for collecting data relating to change in position of a body part along a path and at least one additional event, said device comprising:
- a delayed position sensor for providing a delayed signal value relating to a position of said entity along said path;
- a fast position sensor for providing a fast signal value relating to an approximation of a position of said entity along said path, wherein said fast signal value incorporates less delay and is less accurate than said delayed signal value;
- each one of said sensors mounted on sensor supports for positioning in functional relationship to said entity for measuring the movement of said entity;
- means for measuring changes in said event and providing an event associated signal value;
- a data processor for receiving said event associated signal value and said fast and delayed signal values for said entity, said signal values comprising (a) a present fast signal value and a prior fast signal value relating to approximations of a present and prior position, respectively, from said fast position sensor and (b) a delayed signal value for said prior position from said delayed position sensor, receiving said fast signal value for said present position and said delayed signal value for said prior position in the same sampling cycle, and using said delayed signal and said fast signal values for said prior position to improve said present fast signal value approximation for said present position and relating said improved present fast signal value to said event associated signal value, where the sampling instant for the delayed position sensor is selected independently of the rate of movement of the delayed position sensor.

20. A device according to claim 19, wherein said event associated signal value is a sound wave or electrical signal related to a sound wave.

21. A device according to claim 19, wherein said event is a physiological function.

22. A device according to claim 19, wherein said event is a change in force distribution.

23. A method for accurately determining the movement of an entity along a path, wherein mounted in functional relationship to said entity for measuring the movement of said entity is a delayed position sensor for providing a delayed signal value relating to a position for said entity along said path; and a fast position sensor for providing a fast signal value relating to an approximation of a position for said entity along said path, wherein said fast signal value incorporates less delay and is less accurate than said delayed signal value; said method comprising:

transmitting said fast and delayed signals for said entity to a data processor; and processing said fast and delayed signal values, said signal values comprising (a) a present fast signal value and a prior fast signal value for said entity relating to approximations of a present and prior position, respectively, from said fast sensor and (b) a delayed signal value for said prior position from said delayed sensor, receiving said fast signal value for said present position and said delayed signal value for said prior position in the same sampling cycle, and using said delayed signal and said fast signal values for said prior position to improve said present fast signal value approximation for said present position, where the sampling instant for the delayed position sensor is selected independently of the rate of movement of said delayed position sensor.

24. A method for accurately determining the movement of a body part along a path, wherein mounted in functional relationship to said body part for measuring the movement of said body part is a multiple degree of freedom electromagnetic sensor for providing a delayed signal value relating to a position for said body part along said path; and a multiple degree of freedom accelerometer for providing a fast signal value relating to an approximation of a position for said body part along said path, wherein said fast signal value incorporates less delay and is less accurate than said delayed signal value; said method comprising:

transmitting said fast and delayed signals for said body part to a data processor; and processing said fast and delayed signal values, said signal values comprising (a) a present fast signal value and a prior fast signal value for said body part relating to approximations of a present and prior position, respectively, from said accelerometer and (b) a delayed signal value for said prior position from said electromagnetic sensor, receiving said fast signal value for said present position and said delayed signal value for said prior position in the same sampling cycle, and using said delayed signal and said fast signal values for said prior position to improve said present fast signal value approximation for said present position, where the sampling instant for each electromagnetic position sensor is selected independently of the rate of movement of the said electromagnetic position sensor.

25. A method according to claim 24, wherein said body part comprises a digit.

26. A method according to claim 25, wherein said digit is a thumb.

27. A method for accurately determining the movement along a path of an articulated body part comprising at least two links connected by a joint, wherein mounted in functional relationship to said body part for measuring the movement of said body part is a delayed position sensor for providing a delayed signal value relating to a position for said body part along said path; a fast position sensor for providing a fast signal value relating to an approximation of a position for said body part along said path, wherein said fast signal value incorporates less delay and is less accurate than said delayed signal value; and a goniometer mounted in functional relationship to the joint connecting two links of said body part for providing a fast signal value relating to the bending of said joint; said method comprising:

transmitting said delayed and fast signal values for said body part to a data processor; and processing said fast and delayed signal values, said signal values comprising (a) a present fast signal value and a prior fast signal value for said body part relating to approximations of a present and prior position, respectively, from said fast sensor, (b) a delayed signal value for said prior position from said delayed sensor, and (c) a fast signal value from said goniometer sensor for providing the angle of bending of said joint, receiving said fast signal value for said present position and said delayed signal value for said prior position in the same sampling cycle, and using said delayed signal and said fast signal values for said prior position to improve said present fast signal value approximation for said present position, where the sampling instant for the delayed position sensor is selected independently of the rate of movement of said delayed position sensor.

28. A method according to claim 27, wherein said articulated body part comprises an arm and hand and said joint is the elbow or wrist.

29. A method according to claim 28, wherein mounted on a thumb of said hand is a fast position sensor for providing a fast signal value relating to an approximation of a position for said thumb, and a delayed position sensor for providing a delayed signal value relating to a position for said thumb, said method further comprising:

transmitting said signals from said sensors mounted on said thumb to said data processor; and processing said fast and delayed signal values from said thumb, said signal values comprising (a) a present fast signal value and a prior fast signal value for said thumb relating to approximations of a present and prior position, respectively, from said fast sensor, and (b) a delayed signal value for said prior position from said delayed sensor, receiving said fast signal value for said present position and said delayed signal value for said prior position in the same sampling cycle, and using said delayed signal and said fast signal values for said prior position to improve said present fast signal value approximation for said present position of said thumb.

30. A device for measuring change in position of a movable entity along a path comprising:

a first position sensor for providing a first signal value relating to a position of said entity along said path subject to periods of unreliability;

a second position sensor for providing a second signal value relating to an approximation of a position of said entity along said path, wherein said second signal value is not subject to said periods of unreliability and is less accurate than said first position sensor;

each one of said sensors mounted on sensor supports for positioning in functional relationship to said entity for measuring the movement of said entity;

a data processor for receiving said first and second position sensor signal values for said entity, said signal values comprising (a) a present second signal value and a prior second signal value relating to approximations of a present and prior position, respectively, from said second position sensor and (b) a first signal value for said prior position from said first position sensor, using said first signal value and said second signal values for said prior position to improve said present second signal value approximation for said present position; and during a period of unreliability, using said improved second signal value prior to said period of unreliability as the initial position of said entity at the beginning of said period of unreliability, where the sampling instant for the second position sensor is selected independently of the rate of movement of said second position sensor.

31. A device according to claim 30, wherein said first position sensor is an optical tracker and said second position sensor is an accelerometer or gyroscope.

32. A device for providing an improved signal value in relation to a change in position of a movable entity along a path, said device comprising at least two sensors, wherein each one of a pair of said sensors has deficiency not shared by the other sensor and a proficiency not shared by the other sensor, said deficiencies relating to position and time, said device comprising:

a first position sensor for providing a noisy moderately accurate first position signal;

a second position sensor providing a less accurate less noisy second position signal than said first position sensor;

each one of said sensors mounted on sensor supports for position in functional relationship to said entity for measuring the movement of said entity; and a data processor for receiving said first and second position signals for said entity, and filtering the noise of said first position sensor in inverse relationship to the velocity of said entity as determined from said second position signal to reduce the amount of noise in said first position signal.

33. A device according to claim 32, wherein said first position sensor is an electromagnetic sensor and said second position sensor is an accelerometer or goniometer.

* * * * *